Aug. 20, 1935.　　　　E. J. STAHL　　　　2,011,596
VEHICLE
Filed Jan. 9, 1934　　　3 Sheets-Sheet 1
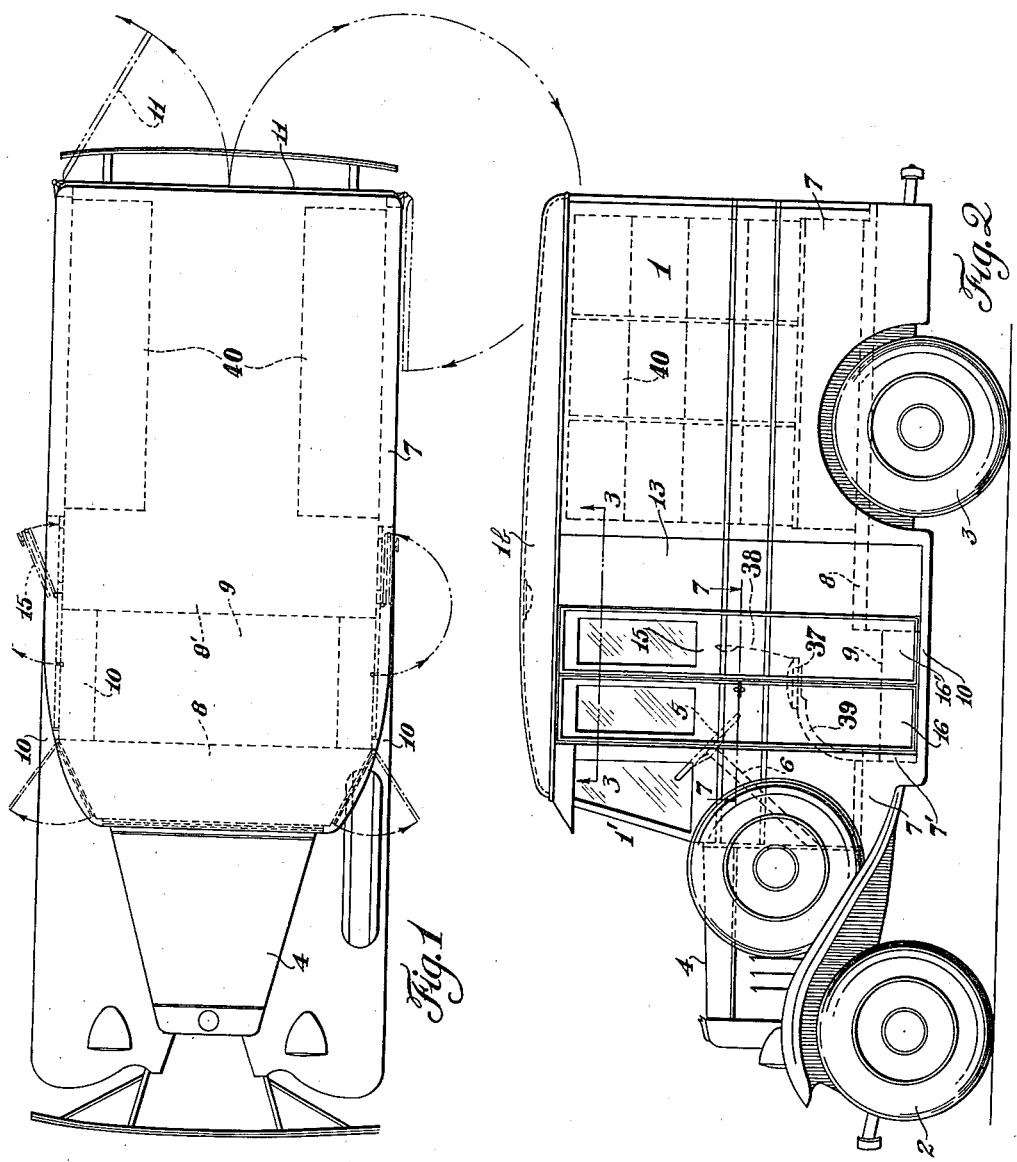
INVENTOR.
Edward J. Stahl
BY Geo. B Pitts
ATTORNEY.

Aug. 20, 1935.   E. J. STAHL   2,011,596
VEHICLE
Filed Jan. 9, 1934   3 Sheets-Sheet 2
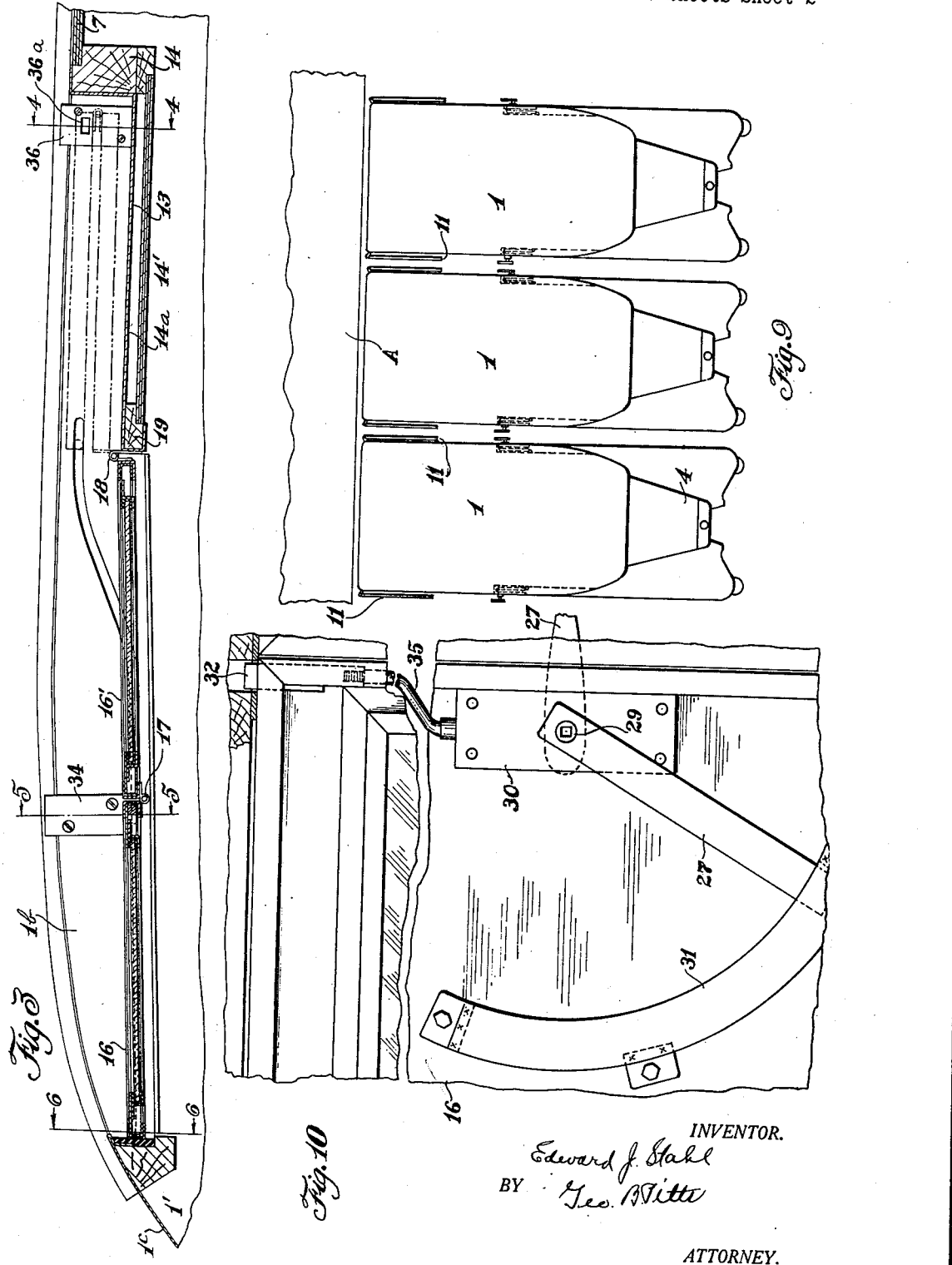

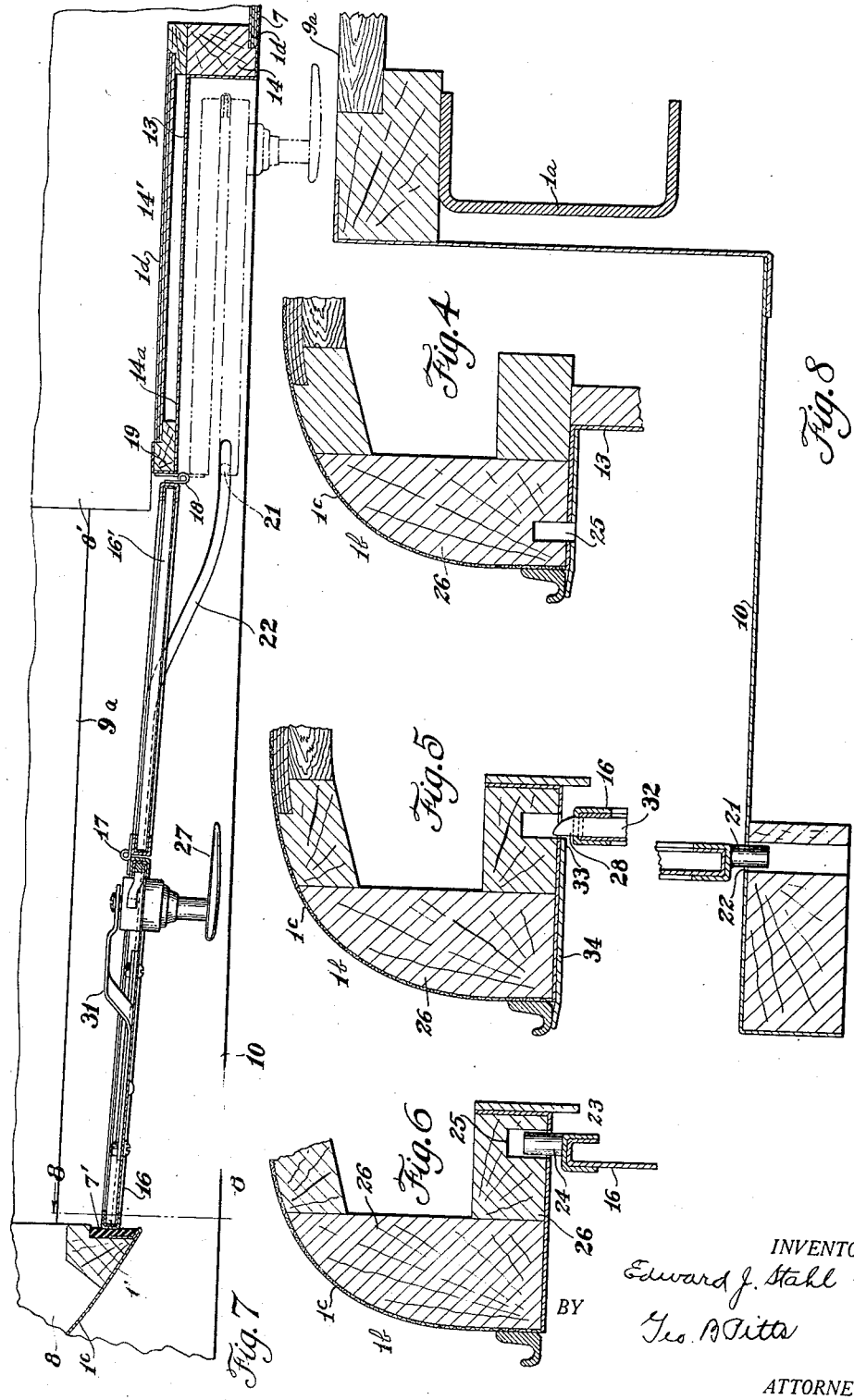

Patented Aug. 20, 1935

2,011,596

UNITED STATES PATENT OFFICE 2,011,596

VEHICLE

Edward J. Stahl, Lakewood, Ohio, assignor to The Baker-Raulang Company, Cleveland, Ohio, a corporation of Ohio Application January 9, 1934, Serial No. 705,908

9 Claims. (Cl. 296—49)

This invention relates to self driven vehicles, more particularly to the bodies therefor. The invention has been applied by me to vehicles particularly useful in house to house deliveries.

One object of the invention is to provide an improved closed vehicle body construction having a door and door mounting incorporated therewith so arranged that when the door is opened it lies within or substantially flush with the exterior walls of the body.

Another object of the invention is to provide for a vehicle body an improved door and door mounting arranged to (a) utilize minimum area laterally of the vehicle body when opened and closed and (b) maximum capacity within the body.

Another object of the invention is to provide for a vehicle body an improved door and door mounting so arranged that positive operation is insured and sticking and jamming are eliminated.

Another object of the invention is to provide an improved door construction and mounting therefor which are materially simplified and which lend themselves for easy operation under all weather conditions.

A further object of the invention is to provide for a vehicle an improved door construction and locking means therefor, so arranged that each may be positively and easily operated.

Other objects of the invention will be apparent to those skilled in the art to which my invention relates from the following description taken in connection with the accompanying drawings, wherein Fig. 1 is a plan view of a vehicle embodying my invention.

Fig. 2 is a side view of the vehicle.

Fig. 3 is a section on the line 3—3 of Fig. 2.

Figs. 4, 5 and 6 are sections on the lines 4—4, 5—5 and 6—6, respectively, of Fig. 3.

Fig. 7 is a section on the line 7—7 of Fig. 2.

Fig. 8 is a section on the line 8—8 of Fig. 7.

Fig. 9 is a plan view of a plurality of vehicles arranged adjacent a loading platform.

Fig. 10 is a fragmentary view substantially on the line 10—10 of Fig. 7.

In the drawings, I indicates as an entirety a closed body mounted on a suitable frame 1a which in turn is mounted on front and rear wheels 2, 3. The propelling means (motor and operating equipment and connections therefor) are preferably mounted within and below a hood 4. The front wheels are suitably connected for steering by means of a device, such as a wheel 5, mounted within the body 1, in a steering column 6.

The body 1 is provided with a front 1', a top 1b and rear side walls 7. The top, side walls and front may consist of a skeleton frame having sheet metal sheathing 1c and laminated walls 1d to form an enclosed structure.

The body 1 is provided with front and rear floorings 8, 8', spaced to provide between them a transverse aisle 9 preferably having a dropped floor or platform 9a which is one relatively short step above the running boards 10. The side walls of the front 1' and rear side walls 7 of the body are arranged substantially flush with the outer edges of the running boards to provide maximum capacity within the body and elimination of exterior projections. The side walls 7 are cut away to provide access to the rear wheels 3. The side walls 7 may be suitably paneled and provided with windows when desired. As the floor 9a for the aisle 9 rests on the vehicle frame 1a and terminates at its opposite ends at approximately the inner side edges of the running boards the latter serve as one intermediate step between the ground and floor 9a, and hence but two steps are required for the driver or operator to stand on the platform 9a. The rear end of the body 1 may be closed by hinged doors 11. The upper portion of the front 1' preferably comprises glass panelled front and side walls 12. The side walls of the front 1' are spaced from the front vertical edges of the side walls 7 to provide at either side of the body, openings 7' related to the aisle 9 for ingress and egress. Between each running board 10 and the top 1b, the front portion of the adjacent side wall 7 is formed with a pocket or off-set, as shown at 13, for a purpose later set forth. Each pocket 13 may be provided by a vertical frame member 14, forming the rear wall of the pocket, and a vertical side wall 14' related to the member 14 disposed inwardly and parallel to the plane of the rear portion of the adjacent side wall 7. The member 14 and wall 14' may be covered with sheet metal 14a (see Fig. 7).

15 indicates as an entirety a door for each opening 7'. Each door 15 comprises hinged together panels, for example, two panels 16, 16', preferably of equal width, hinged to each other at 17 along their inner, adjacent edges, the rearward panel being hinged at 18 along its outer edge to the frame member 19 at the front end of the adjacent pocket 13. Each hinge 17, 18, may be of the piano type. The panels 16, 16', have a combined width equal to that of the door opening 7'. In this arrangement the door panels are swingable and relatively movable into folded side by side relation, when opened, into the adjacent pocket 13, as shown in dotted lines in Figs. 1, 3 and 7. As shown in these views, the pocket 13 has a depth and width (longitudinally of the vehicle) slightly greater than the width and thickness of the door panels when in folded relation, so that in the open position of the door, the panels are within the plane of the side walls 7 and running board 10; also, with either or both doors open, the vehicle may be parked in close relation to other objects, or a plurality of vehicles may be compactly related for parking or in relation to a loading platform A, as shown in Fig. 9. Likewise, since the door or doors when opened are disposed within the plane of the rear side walls, danger of the doors engaging with or engaged by other objects, while the vehicle is being driven, is entirely eliminated.

20 indicates as an entirety guide means for the front end of each front panel 16. These guide means comprise a pin 21 suitably fixed to and depending from the door panel 16 adjacent its outer or free edge and a slot 22 formed in the adjacent running board 10 and in which the pin slides and rotates during the opening and closing of the door. The slot 22 is curved laterally (see Fig. 7) to compensate for the movement of the panel 16 into its folded position. The slot 22 is open at its lower end (see Fig. 8) throughout its entire length, so that dirt and dust, as well as snow and ice, cannot accumulate therein. As the slot is open, the pin 21 will operate to keep it clear of obstructions. 23 indicates as an entirety guide means for the front end of each front door panel between its upper edge and the top 1b. The guide means 23 comprise a pin 24 in axial alignment with the pin 21 and projecting upwardly from the panel 16 and a slot 25 formed in the top sill 26. The slot 25 corresponds in shape, arrangement and extent to the slot 22, so that both the upper and lower ends of the panel 16 are guided and maintained in the same plane in the opening and closing movements of the door panels. As later set forth, since the operating handle (indicated at 27) and the lock means (indicated at 28) for each door are mounted on the outer panel 16, it follows that a major portion of the pressure or force utilized to open the door or close it will be imparted to this panel; accordingly danger of distorting the alignment of the door panels with respect to each other and the frame member 19 or the hinge elements between these parts, is avoided by providing the guide means or pivotal sliding connections 20, 23 between both the lower and upper ends of the panel 16 and running boards, and the top, respectively.

The handle 27 is connected to a shaft 29 suitably mounted in a casing 30. The inner end of the shaft 29 carries an inner handle 27' the outer end of which has sliding engagement with an arculate member 31 secured to the door panel 16. The shaft 29 is operatively connected to a spring operated latch 32 forming one element of the locking means 28. The latch 32 is slidably mounted in an opening formed in the walls of the panel 16 (see Fig. 5) and normally projects beyond the panel to engage the end wall 33 of a keeper 34. The keeper 34 is suitably secured to the sill 26. The latch 32 is connected to a rod 35, which extends downwardly, its lower end terminating in the casing 30 and so connected to the shaft 29 that operation of the latter will retract the latch against its biasing spring (not shown). 36 indicates a supplemental keeper fixed to the sill 26 and formed with an opening 36a arranged to receive the latch 32 when the doors are in open position. Accordingly, the locking means 28 serve to lock the door in closed position and in open position.

In my construction of body, by the use of foldable door panels, the space rearward of the doors 15 is utilized for storing purposes. Since slide and guide means for slidable doors are eliminated, the rear side walls of the body may be positioned in the planes of the outer edges of the running boards, thus permitting the body to extend over the rear wheels. In this arrangement, the floors 8, 8', may be arranged relatively low, as limited by the height of the rear axle housing, and extended laterally between the front and rear wheels substantially to the outer edges of the running boards. Also, by providing an aisle between the floors 8, 8', with a dropped floor 9a, related to the doors, only two short steps from the ground are required when getting in and out of the body. Furthermore, by the use of hinged doors, (a) danger of guides and supports for sliding doors becoming disaligned and causing sticking or jamming of the doors, is entirely eliminated; (b) the doors and their mountings are in an accessible position to permit of ready repairs when necessary; and (c) by the use of foldable doors, but little area laterally of the vehicle is required to open and close them.

The body may be provided with a seat 37 having a foldable back 38 and the support 39 for the seat may be mounted at its lower end on a pivot to permit the seat to be moved to an inoperative position to clear the aisle 9. Shelves 40 or other devices may be provided in the body for holding goods and packages.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. The combination of a closed vehicle body having a front, side walls and a top, said front and one side wall being spaced to form an opening for ingress and egress, a door hinged along its rearward vertical edge to the adjacent vertical edge of said side wall and comprising hinged together inner and outer panels arranged to be relatively moved into side by side relation parallel to the adjacent side wall when the door is opened, said side wall being formed adjacent said opening with a pocket to receive said door panels when moved into folded relation, latching means between the inner end portion of the outer door panel and said body, and a separate latching element on said body arranged to be releasably engaged by the latching element on said outer door panel when the door panels are moved to their open position.

2. The combination of a closed vehicle body having a front, side walls and a top, said front and one side wall being spaced to form an opening for ingress and egress, said side wall being provided adjacent said opening with an off-set wall forming a vertically extending recess or pocket, and hinged together door panels for said opening, said inner panel being hinged to the free vertical edge of said off-set wall and said panels being swingable relative to each other to a folded, side by side relation into said recess or pocket substantially parallel to said side wall.

3. The combination of a closed vehicle body having a front, side walls and a top, said front and one side wall being spaced to form an opening for ingress and egress, said side wall being provided adjacent said opening with an off-set wall forming a vertically extending recess or pocket, and hinged together door panels for said opening, said inner panel being hinged to the free vertical edge of said off-set wall and swingable relative thereto and said sections being swingable relative to each other to a folded, side by side relation into said recess or pocket parallel to the adjacent side wall, and means for detachably securing one of said panels to said body when said panels are folded into said recess or pocket.

4. The combination of a closed vehicle body having a front, side walls and a top, spaced floorings for said body forming an aisle having a floor disposed in a plane therebelow, said front and side walls being spaced to form openings related to said aisle for ingress and egress, and a door hinged along its rearward vertical edge to the adjacent vertical edge of each said side wall and comprising hinged together inner and outer panels arranged to be relatively moved into folded side by side relation when the door is opened, each said side wall being formed at its front end with a pocket to receive said door panels to permit them to be folded in side by side relation parallel to the said side wall.

5. The combination of a closed vehicle body having a front, side walls, a top and running boards, a flooring for the rear portion of the body between said side walls, a floor disposed in a plane intermediate said running boards and flooring and forming a platform for the operator, said front and side walls being spaced to form openings between said top and the said running boards and related to said floor for ingress and egress, and a floor hinged along its rearward vertical edge to the adjacent vertical edge of each said side wall and comprising hinged together inner and outer panels arranged to be relatively moved into folded side by side relation parallel to the adjacent side wall when the door is opened, each said side wall being formed adjacent said opening with a pocket to receive said door panels when the latter are moved into folded relation.

6. The combination of a closed vehicle body having a front, side walls, a top and running boards, a flooring for the rear portion of said body between said side walls, the front portion of said flooring extending laterally approximately to the outer side edges of said running boards, a floor disposed in front of said flooring and in a plane intermediate said flooring and running boards and terminating at its opposite ends approximately at the inner side edges of said running boards, said front and side walls being spaced to form openings adjacent the outer side edges of said running boards and opposite said floor, for ingress and egress, and a door for each opening hinged along its rearward vertical edge to the vertical edge of the adjacent side wall and comprising hinged together inner and outer panels arranged to be relatively moved into folded side by side relation parallel to said side wall when the door is opened, each said side wall being formed adjacent said opening with a pocket to receive said door panels when the latter are moved into folded relation.

7. In a delivery vehicle, the combination of a wheel mounted chassis, a body thereon having a top and a rearward storage compartment the side walls of which are disposed outwardly of the chassis and spaced a distance substantially equal to the tread of the wheels, one side wall of the body forward of said compartment having a door opening, a running board contiguous to the chassis adjacent the said opening, that portion of the side wall adjacent to and rearward of said opening being off-set inwardly in a plane parallel to the remaining portion of the side wall to form a recess, and a door structure for said opening between said top and said running board, said structure comprising hinged together sections one of which is hingedly connected along its outer edge to the free edge of said off-set portion and the outer end of the other section having slidable and pivotal connections with said top and said running board, said sections being foldable into side by side relation in said recess parallel to the side wall thereof.

8. In a delivery vehicle, the combination of a wheel mounted chassis, a body thereon having a top and a rearward storage compartment the side walls of which are disposed outwardly of the chassis and spaced a distance substantially equal to the tread of the wheels, one side wall of the body forward of said compartment having a door opening, a running board contiguous to the chassis adjacent the said opening, that portion of the side wall adjacent to and rearward of said opening being off-set inwardly in a plane parallel to the remaining portion of the side wall to form a recess, and a door structure for said opening between said top and said running board, said structure comprising hinged together sections one of which is hingedly connected along its outer edge to the free edge of said off-set portion and the outer end of the other section having slidable and pivotal connections with said top and said running board, said connections comprising pins projecting from the upper and lower edges of said outer section and fitting grooves in said top and said running board, and said sections being foldable into side by side relation in said recess parallel to the side wall thereof.

9. In a delivery vehicle, the combination of a wheel mounted chassis, a body thereon having a top and a rearward storage compartment the side walls of which are disposed outwardly of the chassis and spaced a distance substantially equal to the tread of the wheels, one side wall of the body forward of said compartment having a door opening, a running board contiguous to the chassis adjacent the said opening, that portion of the side wall adjacent to and rearward of said opening being off-set inwardly in a plane parallel to the remaining portion of the side wall to form a recess, and a door structure for said opening between said top and said running board, said structure comprising hinged together sections one of which is hingedly connected along its outer edge to the free edge of said off-set portion and the outer end of the other section having slidable and pivotal connections with said top and said running board, said connections comprising pins projecting from the upper and lower edges of said outer section and fitting grooves in said top and said running board and said sections being foldable into side by side relation in said recess parallel to the side wall thereof, the groove in said running board extending therethrough throughout its length.

EDWARD J. STAHL.